United States Patent [19]

Lauben et al.

[11] 4,079,344

[45] Mar. 14, 1978

[54] PORTABLE GROUND FAULT CIRCUIT INTERRUPTING DEVICE

[75] Inventors: Robert W. Lauben, West Simsbury; Stephen F. Gillette, Rocky Hill; Dennis J. Doughty, Plainville, all of Conn.

[73] Assignee: General Electric Company, New York, N.Y.

[21] Appl. No.: 718,905

[22] Filed: Aug. 30, 1976

[51] Int. Cl.[2] .......... H02H 3/00

[52] U.S. Cl. .......... 335/2; 339/119 R; 339/154 A; 339/220 R; 361/45

[58] Field of Search .......... 339/119 R, 38, 154 R, 339/154 A, 156 R, 157 C, 220 R; 361/45, 331, 332, 376; 335/18, 2, 187; 200/51 R

[56] References Cited

U.S. PATENT DOCUMENTS

| | | | |
|---|---|---|---|
| 2,755,453 | 7/1956 | Cloutier | 339/220 R |
| 2,805,294 | 9/1957 | Edmunds | 339/38 |
| 3,857,096 | 12/1974 | Gregory | 324/127 |

*Primary Examiner*—Gerald P. Tolin

*Attorney, Agent, or Firm*—Robert A. Cahill; Walter C. Bernkopf; Frank L. Neuhauser

[57] ABSTRACT

A portable ground fault circuit interrupting (GFCI) device includes a housing equipped with two sets of back mounted contact blades or prongs for insertion in a conventional duplex wall receptacle. One set of contact blades conveys current from one socket of the wall receptacle to a known GFCI receptacle via a relay, both mounted within the housing. The other set of blades are dummy blades frictionally engaged in the other wall receptacle socket to reliably retain the portable GFCI device in place. The GFCI receptacle is accessible through a front opening in the housing for plug connection with circuits for which ground fault protection is afforded.

8 Claims, 10 Drawing Figures

FIG. 1
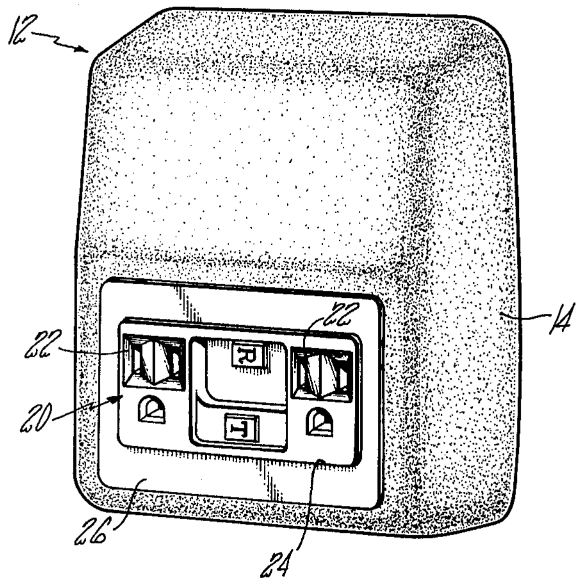
FIG. 2
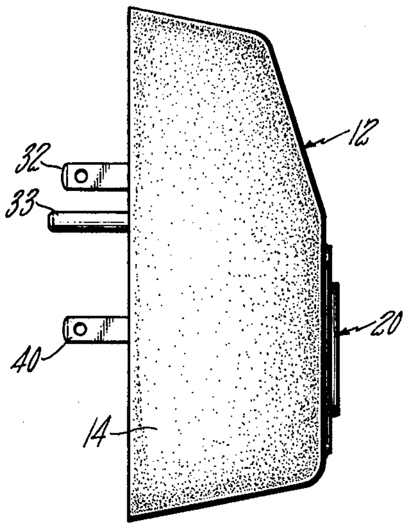
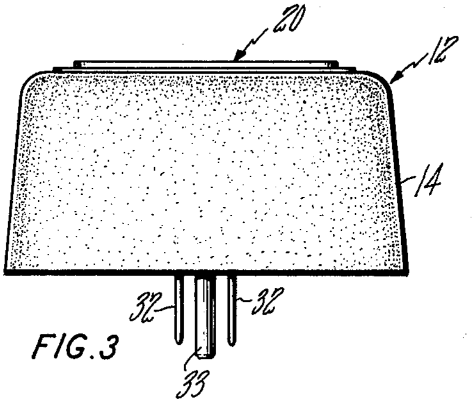
FIG. 3
FIG. 4
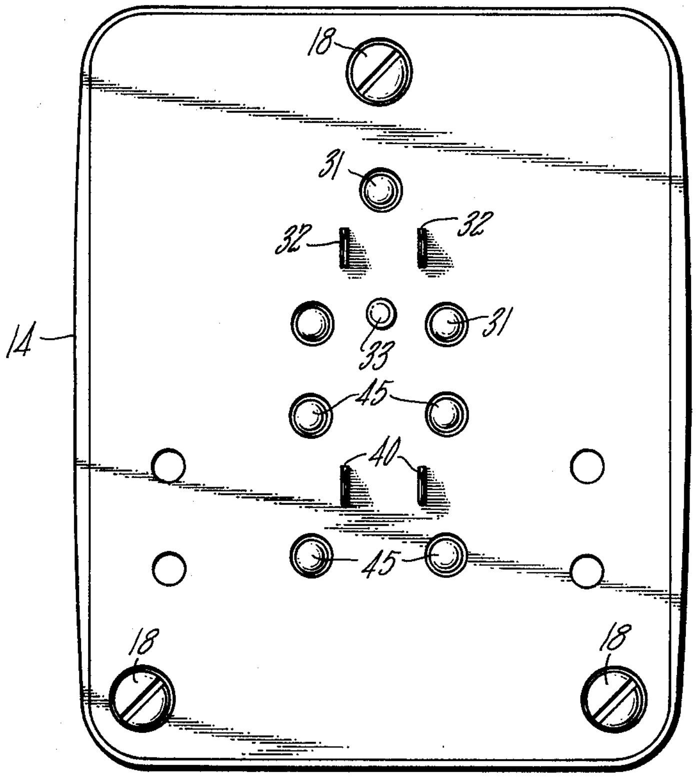

FIG. 5
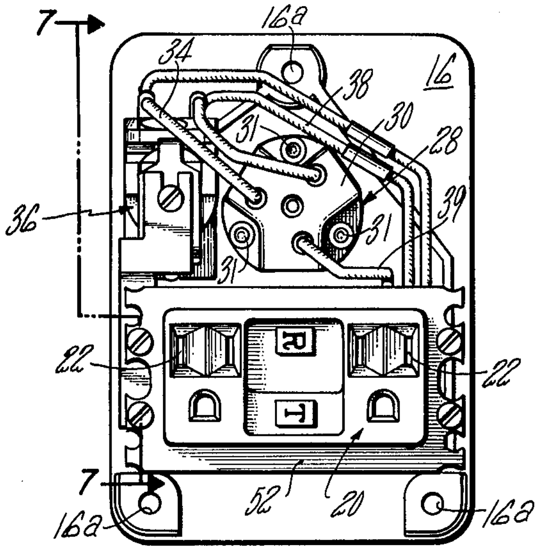
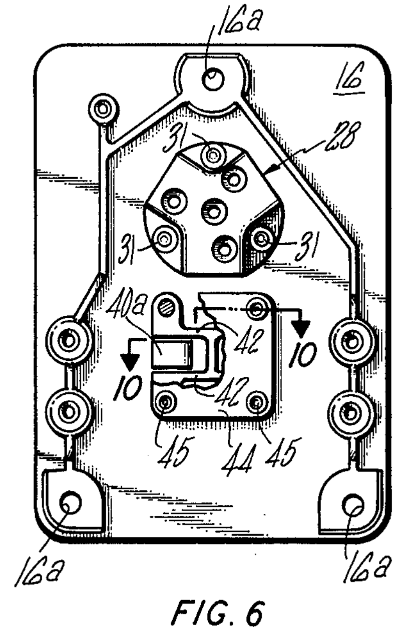
FIG. 6

FIG. 7
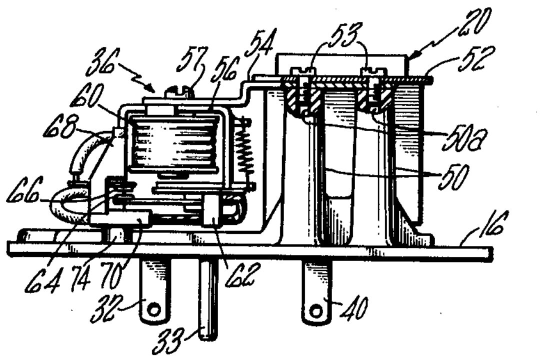
FIG. 8
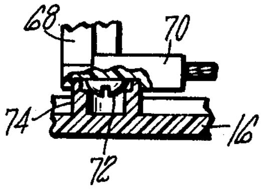
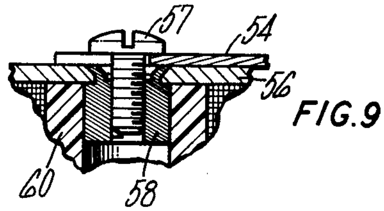
FIG. 9
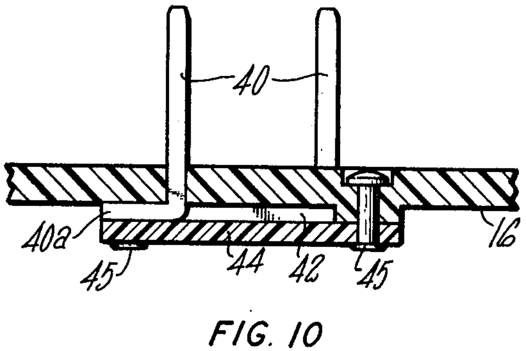
FIG. 10

PORTABLE GROUND FAULT CIRCUIT INTERRUPTING DEVICE

BACKGROUND OF THE INVENTION

Ground fault circuit interrupting (GFCI) devices have become widely accepted as effective means for protecting humans from the hazards of electrical shock. The 1975 National Electric Code defines a GFCI device as one "whose function is to interrupt the electric circuit to the load when a fault current to ground exceeds some predetermined value that is less than that required to operate the overcurrent protective device of the supply circuit". Originally, GFCI devices were provided in circuit breaker configurations for installation in existing service entry equipment, i.e., circuit breaker load centers. Later, GFCI devices were provided in receptacle configurations for installation in existing wall outlet boxes. Since the installation of these two GFCI configurations involves a certain amount of actual wiring, they are largely dedicated to the circuit in which they are installed.

Recently, some manufacturers have introduced a so-called "portable" GFCI device which can be plugged into a conventional wall receptacle and is adapted to afford ground fault protection to any load circuit plugged into it. In this configuration, the GFCI device can simply be unplugged from one receptacle and plugged into another receptacle at a location more convenient to the load circuit for which ground fault protection is desired.

It is accordingly an object of the present invention to provide an improved portable GFCI device.

A further object is to provide a portable GFCI device of the above-character which is constructed to utilize an existing GFCI receptacle.

Still another object of the present invention is to provide a portable GFCI device of the above-character having improved mounting provisions adapting the device for safe and reliable physical attachment to and electrically connected with a conventional electrical wall receptacle.

An additional object is to provide a portable GFCI device of the above-character which is efficient in design, inexpensive to manufacture and safe to use.

Other objects of the invention will in part be obvious and in part appear hereinafter.

SUMMARY OF THE INVENTION

In accordance with the present invention, there is provided a portable GFCI device having an insulative housing to which are mounted a pair of rearwardly extending electrical connectors in the form of contact blades or prongs for insertion in one socket of a duplex wall receptacle pursuant to obtaining electrical power therefrom. The contact blades are connected to energize the coil of a relay which closes its contacts to complete an energization circuit from the blades to a GFCI receptacle mounted within the housing. The socket of the GFCI receptacle is accessible through an opening in the housing for acceptance of a plug connected in the load circuit to be protected against hazardous ground faults.

To reliably retain the portable GFCI device with its electrical connector blades plugged into the one wall receptacle socket, the housing mounts a pair of dummy blades or prongs which are positioned for insertion in the other socket of the wall receptacle. It has been discovered that these dummy blades together with the contact blades, upon being inserted in the two sockets of a duplex wall receptacle, are more than adequate in preserving the requisite operative relationship of the portable GFCI device with the wall receptacle. Yet, the portable device can be readily removed from the wall receptacle (simply by unplugging it) for operative adaptation to another duplex wall receptacle in some other location.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

FIG. 1 is a perspective view of the portable GFCI device constructed in accordance with the invention;

FIG. 2 is a side view of the portable GFCI device of FIG. 1;

FIG. 3 is an end view of the portable GFCI device of FIG. 1;

FIG. 4 is a back view of the portable GFCI device of FIG. 1;

FIG. 5 is a plan view of the GFCI device of FIG. 1 with its cover removed;

FIG. 6 is a plan view similar to FIG. 5, but with components removed;

FIG. 7 is a sectional view taken along line 7—7 of FIG. 5;

FIG. 8 is an enlarged, fragmentary view, partially broken away, of a portion of FIG. 7;

FIG. 9 is an enlarged, fragmentary sectional view of another portion of FIG. 7; and FIG. 10 is a sectional view taken along line 10—10 of FIG. 6.

Like reference numerals refer to like parts throughout the several views of the drawings.

DETAILED DESCRIPTION

The portable GFCI device of the present invention, as seen in FIGS. 1 through 4, includes an insulative plastic housing, generally indicated at 12, consisting of an essentially box-like cover 14 and a housing backwall or cover base 16 secured together by screws 18 extending through holes *16a* (FIG. 5) in the base and threaded into molded bores (not shown) formed in the cover. Mounted within housing 12 in a manner to be described in connection with FIGS. 5 and 7 is a GFCI receptacle, generally indicated at 20 in FIG. 1; this receptacle having plug accepting electrical sockets 22 accessible through an opening 24 provided in the front wall 26 of cover 14. The GFCI receptacle may be and preferably is a commercially available device such as currently being marketed by the General Electric Company and as also disclosed in detail in the commonly assigned, co-pending application, Ser. No. 624,720, filed Oct. 22, 1975, now U.S. Pat. No. 4,010,432.

Turning to FIGS. 5 and 6, mounted to the housing is an attachment plug, generally indicated at 28, including an insulative cap 30, affixed to the inner side of base 16 by suitable means such as rivets 31. Mounted by cap 30 and extending rearwardly through openings in base 16 are a pair of contact blades 32 and a grounding pin 33 (FIGS. 3 and 4). Leads 34 connect contact blades 32 to the coil of a relay, generally indicated at 36, such that with the contact blades plugged into a live wall receptacle the relay coil is energized to effect closure of its relay contacts. The contact blades 32 are also connected via leads 34, the relay contacts when closed, the leads 38 to energize the sockets 22 of the GFCI receptacle 20 and also to power up the electronic module incorporated therein. Lead 39 connects the ground pin 33 to a ground terminal of the GFCI receptacle 20.

The relay is provided as a safety measure to interrupt the circuit between the contact blades 32 and the GFCI receptacle 20 in the event the wall receptacle into which the contact blades are inserted has a discontinuity in the neutral side of the power circuit feeding the wall receptacle. It will be appreciated that such a discontinuity would prevent the electronic module in the GFCI receptacle 20 from being powered up to provide the desired ground fault protection, and yet, but for relay 36, the hot line side of the wall receptacle circuit could be coupled through to the GFCI receptacle sockets 22 and thence to any load circuit plugged into these sockets. In this situation, the potential for an electrical shock exists for a person coming in contact with the hot side of the load circuit and ground. Since the GFCI electronic module is not powered up, the GFCI receptacle is incapable of operating to interrupt the circuit before harmful consequences can ensue. However, with the inclusion of relay 36, there is assurance that the distribution circuit to the wall receptacle will be effective to energize the electronic GFCI module when the circuit between the GFCI receptacle sockets and the wall receptacle sockets is completed.

In accordance with a signal feature of the present invention, the portable GFCI is equipped with a pair of metallic dummy blades 40 extending rearwardly through slots in base 16. As seen in FIGS. 6 and 10, the inner end portions 40a of these dummy blades are laterally turned for receipt in three-sided cavities formed by raised barriers 42 molded with base 16. An insulative plate 44 is affixed to base 16 by rivets 45 in position against the tops of barriers 42 to capture the turned portions 40a in their respective pockets and thus firmly hold the dummy blades 40 in position while achieving electrical isolation therebetween. The positioning of the dummy blades 40 relative to the contact blades 32 is such that, upon insertion of the contact blades in one socket of a duplex wall receptacle, the dummy blades can be inserted in the other socket thereof. These dummy blades serve no electrical function whatsoever, but rather cooperate with the contact blades in physically mounting the portable GFCI device to the duplex wall receptacle. This unique approach to mounting a portable GFCI device in operative relation with a duplex wall receptacle affords the advantages of safety and convenience not found in other portable GFCI devices. The accepted mounting practice heretofore has been to provide a mounting screw held captive in the device housing in a location such that with the contact blades inserted in the socket of a wall receptacle, the device mounting screw can be threaded into the tapped bore of the receptacle which normally accepts the receptacle faceplate mounting screw. Thus, the receptacle faceplate mounting screw had to be removed prior to plugging in of the portable GFCI device. This is not only inconvenient, but it is potentially hazardous if the receptacle faceplate is metallic. If the faceplate is left in place while the portable GFCI device is being plugged in, there exist the possibility that it can fall down into a position bridging the contact blades at the time they become energized from the wall receptacle. Applicants are aware of this very situation occurring on one occasion and the arcing that ensued was extremely violent and frightening to behold.

It is readily apparent that with the portable GFCI device mounting provisions of the instant invention, the necessity of removing the wall receptacle faceplate mounting screw is eliminated, and thus the above-described situation cannot occur. Moreover, applicants' unique mounting provision is found to be quite secure and reliable, which, coupled with the convenience and safety of being able to merely plug and unplug the portable GFCI to change its location, renders applicants' portable GFCI device singularly attractive.

The base 16, as best seen in FIGS. 6 and 7, is integrally formed with four molded upright posts 50 which serve to seat on their free ends the mounting flange 52 of GFCI receptacle 20. Screws 53 pass through holes in the mounting flange and thread into formed bores 50a in the posts pursuant to securing the GFCI receptacle in place. To mount relay 36, a rigid, elongated bracket 54 is clamped at one end between the GFCI receptacle mounting flange 52 and posts 50 by screws 53. The other end of bracket 54 is secured to the frame 56 of relay 36 of a screw 57. As best seen in FIG. 9, screw 57 is threaded into a tapped bore formed in a hub 58 staked to the relay frame 56; the hub also serving to mount the relay coil assembly 60. Frame 56 also pivotally mounts an armature 62 which carries movable contacts 64 for movement into and out of engagement with stationary contacts 66. These stationary contacts are mounted by an insulative terminal block 68 affixed to relay frame 56. An insulative cap 70 is secured to the lower end of terminal block 68 by a screw 72 (FIG. 8) to serve as a stop limiting the movement of the movable contacts away from the stationary contacts.

To provide bottom support for the relay, as well as to locate its position on base 16, a tubular pedestal 74 is molded to the base, as seen in FIG. 8. The free end of the pedestal and the region of the cap surrounding the head of screw 72 are recessed such that the screw head can nest on the pedestal, thus insuring that the mounted position of the relay cannot shift laterally.

It will thus be seen that the objects set forth above, among those made apparent in the prededing description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A portable ground fault circuit interrupting device for adaptation to a conventional duplex electrical wall receptacle, said portable device comprising, in combination:

A. an insulative housing having front, back and sidewalls;

B. a plug assembly mounted to said housing backwall and including at least two contact blades extending rearwardly beyond said backwall for insertion in one socket of the wall receptacle;

C. mounting means including a pair of electrically isolated dummy blades affixed to said backwall and extending rearwardly beyond said backwall for insertion in the other socket of the wall receptacle, said contact and dummy blades constituting the sole means for physically supporting the portable device in operative relation with the wall receptacle;

D. a ground fault circuit interrupting receptacle capable of interrupting the circuit in the event of a ground fault and mounted within said housing and having at least one socket accessible through an opening in said housing frontwall; and E. electrical leads connecting said contact blades to said ground fault circuit interrupting receptacle for energizing same from the wall receptacle.

2. The portable device defined in claim 1, wherein said dummy blades are each formed with laterally turned inner end portions, said base is formed having raised barrier walls defining cavities accommodating said turned end portions in electrically isolated relation, and said mounting means further including an insulative plate affixed to said backwall and spanning said cavities to clamp said turned end portions therein pursuant to securing said dummy blades in operative positions.

3. The portable device defined in claim 1, which further includes a relay mounted within said housing and having an operating coil and normally open contacts, said leads connecting said contact blades to said operating coil for energizing same to close said contacts and connecting said contact blades to said ground fault circuit interrupting receptacle via said closed relay contacts.

4. The portable device defined in claim 3, wherein said dummy blades are each formed with laterally turned inner end portions, said base is formed having raised barrier walls defining cavities accommodating said turned end portions in electrically isolated relation, and said mounting means further including an insulative plate affixed to said backwall and spanning said cavities to clamp said turned end portions therein pursuant to securing said dummy blades in operative positions.

5. The portable device defined in claim 4, wherein said backwall is integrally formed with a plurality of upright posts located in flanking relation to said mounting means, said ground fault circuit interrupting receptacle including a mounting flange mounting said ground fault circuit interrupting receptacle on the free ends of said posts in overlying relation with said insulative plate.

6. The portable device defined in claim 5, which further includes a bracket having a first end affixed with said mounting flange to at least one of said upright post and second end secured to said relay.

7. The portable device defined in claim 6, wherein relay includes a frame and an operating coil mounting hub affixed to said frame, said hub having means providing a tapped bore for receipt of a screw clamping said frame to said bracket second end.

8. The portable device defined in claim 7, wherein said backwall is integrally formed with an upright pedestal received in a recessed portion of said relay pursuant to assisting said bracket in positionally mounting said relay.

* * * * *